Figure 1:
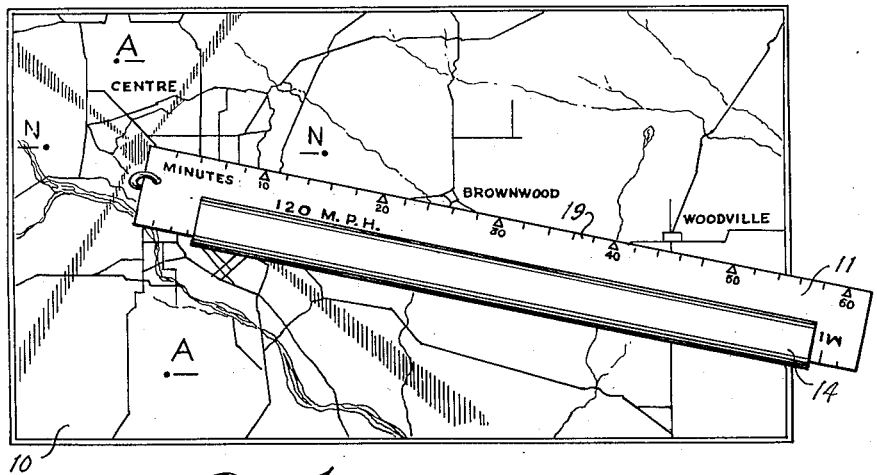

May 22, 1951      P. R. SHIPPS      2,554,449

RULER FOR MEASURING TIME OF FLIGHT OR DISTANCE ON CHARTS

Filed Oct. 7, 1946

Paul R. Shipps
INVENTOR.

BY *Ahley & Ahley*

ATTORNEYS

Patented May 22, 1951

2,554,449

UNITED STATES PATENT OFFICE 2,554,449

RULER FOR MEASURING TIME OF FLIGHT OR DISTANCE ON CHARTS

Paul R. Shipps, Zanesville, Ohio

Application October 7, 1946, Serial No. 701,778

4 Claims. (Cl. 33—1)

This invention relates to new and useful improvements in rulers for measuring time of flight or distance on charts.

Any type of navigation is based on a knowledge of two essentials, the direction of travel or course to be followed, and the speed to be made good along that course. The intended true course for a trip can be determined with considerable exactness by measuring the course angle on a navigational chart. Likewise, a pilot or ship's navigator knows or can determine the speed of his craft (through its medium) with considerable accuracy. However, both an aircraft in flight and a ship at sea move through a medium which is itself moving with respect to the earth, and that movement can greatly effect both the direction and speed the craft actually travels relative to the earth.

In aerial navigation in particular, an aircraft flies in a medium which is not only moving, but moving in a very erratic manner. These movements of air masses, or winds, are constantly changing in both velocity and direction. A pilot can expect a different wind velocity and direction if he changes his altitude a thousand feet higher or lower; he can expect a different wind when he arrives ten or twenty miles away from his starting point; or he may see signs of a changing wind simply by staying at the airport and watching the wind indicator fluctuate and shift about.

In most localities during normal weather, winds near the surface have a velocity of from 5 to 30 M. P. H. At moderately higher altitudes of a few thousand feet above the terrain, where most flying is done, the winds vary over a wider range of velocities and winds of 50 M. P. H. and more are not uncommon. Hence, any normal wind condition has a decided effect on an aircraft's speed and direction of travel, the effect, of course, being proportionately greater to slower flying planes than to fast ones. For instance, a plane flying at 90 M. P. H. airspeed is slowed to 60 M. P. H. by a 30 M. P. H. direct headwind, while speeded to 120 M. P. H. by a 30 M. P. H. direct tailwind. Similarly, a slow plane in a strong crosswind appears from the ground to be flying as much sideways as it is forward. In the faster flying planes the effect of normal winds is not so striking, but is definitely a matter to be reckoned with.

Since winds usually vary with changes in altitude, a pilot having advance weather information can often choose a flight altitude where the winds are most helpful or of least hindrance to his ground-speed. Or, by checking his ground-speed while enroute, a pilot may determine which of several altitudes is most advantageous. However, regardless of whether he uses the winds to best advantage, a pilot on a cross-country trip from one point to another knows he has to cope with the effect of wind, on both his speed and his direction of travel.

Practically all aerial navigation is done with the aid of special aeronautical charts or maps, available from government agencies or private concerns. These charts are drawn to scale and normally shown cities, towns, rivers, lakes, railroads, prominent highways, race tracks, and other terrain features that are easily noticed from an aircraft in flight, as well as airports and other aeronautical aids or installations. In any "contact" flying (flying when cloud and visibility conditions are such that the altitude and position of the aircraft can be maintained by visual reference to the earth's surface) much use is made of these prominent terrain features which are called check points.

In using aeronautical charts for cross-country flying, the pilot determines the true course for the trip by drawing a straight line between the point-of-departure and destination and measuring the angle between this course line and true north. This true course can be corrected for magnetic variation and compass error, both of which the pilot may know with considerable accuracy, to arrive at a compass course. Thus far the course for a trip can be determined accurately. However, before he has an actual compass heading to fly which will keep his plane on the desired course, the pilot must consider the variable factor, wind. He must consider the correction necessary to prevent the wind from drifting him off-course. For this he uses an assumed wind direction and velocity arrived at through observation and guesswork or on the advice of a weather bureau.

After the pilot is in flight, he almost always must change his compass heading one or more times during the flight to remain on-course, due to the variable nature of winds and other factors affecting the heading. In fact, during an ordinary cross-country flight, a pilot flies a number of compass headings differing from each other by perhaps 5 or 10 degrees or more. He may actually cross and recross his true course line several times during the trip. When he notices that his plane is somewhat off-course to the right, he attempts to correct the condition by flying a heading slightly to the left of the previous one. Later he may find he is still off-course and make another correction, and so forth.

The pilot recognizes the fact that he is off-course and the amount he is off by identifying check points and comparing their position relative to him with their position on the chart relative to his course line. It is therefore very important that a pilot be able to definitely identify check points, that is, to distinguish between check points which appear similar on a chart or from the air, if he intends to fly cross-country without relying on radio ranges or other such aids which are often not available. A mistakenly identified check point or two, with the attempted correction in heading that probably results, can cause a pilot much confusion.

Similar check points such as different towns, different lakes, different highways, etc. look very much alike from the air or on a navigational chart. In addition, many smaller towns, lakes, highways, etc. which a pilot sees in the more populated sections of the country, are not on the aeronautical charts due to a lack of space. Hence a pilot to be able to definitely identify a check point, he needs to know when he should be near it. This is done by knowing the approximate ground-space being made good, and using the time-speed distance principle as discussed below.

Under given conditions of loading and power output, an aircraft will maintain an approximately constant airspeed; that is, its speed relative to the air mass it is flying in will remain fairly constant. However, due to winds (movement of air masses relative to the ground) the ground-speed or speed of an aircraft relative to the earth's surface is usually quite different than the airspeed of the craft. The ground-speed of an aircraft while flying at constant airspeed can vary widely on different flights or different sections of a long flight, since it is dependent upon the winds prevailing at the time, location and altitude.

Knowing the ground-speed being made good is often important to a pilot for reasons in addition to helping him locate and identify check points. Keeping aware of his ground-speed makes possible accurate estimates of time-of-arrival at destination; aids in choosing a flight altitude having the most favorable winds; aids in planning deviations from his course to circumnavigate storms; helps in deciding what refueling point can be reached with ample fuel reserve; and is of value in other similar ways.

Almost any form of aerial navigation is based on dead reckoning, and a major part of dead reckoning navigation lies in the time-speed-distance relationship. If any two of the three variables, time, speed, and distance, are known in a problem, the third can readily be determined by computation.

There are three basic problems involving the time-speed-distance relationship that are recurring constantly during a cross-country flight. (1) The pilot wants to known his approximate time-of-arrival at destination, and his approximate time-of-arival at different check points ahead so that he will be able to recognize them. (2) Due to the variations in winds and their direct effect on his ground-speed, he wishes to know at frequent intervals what his true ground speed is, in order to more accurately determine his time-of-arrival at various points. (3) He may want or need to know his present position at some certain time when no check points are around.

Accurate aerial navigation, as taught in textbooks and navigation classes, makes much use of the above and similar problems. It is simply a matter of measuring distances in miles, time in minutes, using speed in miles-per-hour, and finding the unknown with a simple algebraic computation. All pilots and navigators have access to circular slide-rule type computers to take the work out of these computations. But, except perhaps for the original estimated time-of-arrival at destination, most pilots do not bother with the measuring and computing. They simply guess at the time it will take to cover a given distance on the map, or they may ignore the time-speed-distance principle entirely and rely on recognizing check points by sight alone. These methods, particularly under trying conditions of weather, visibility, etc. frequently result in mistakes in identifying landmarks, general confusion, and sometimes end with the pilot's becoming hopelessly lost.

It is, therefore, one object of this invention to provide an improved navigational device having means for measuring distances on a map or chart in units of time rather than units of distance, and thereby solving navigational problems quickly and without computations by the pilot.

Another object of this invention is to provide an improved navigational device wherein provision is made for a multiplicity of aircraft speeds so that the device is adaptable to different aircraft or to different rates of travel in a given aircraft.

A still further object of the invention is to provide an improved navigational device for measuring distances on maps or charts in terms of time units which is simply and conveniently arranged so that only the desired scale is visible, and wherein means are provided for holding the various scales in convenient manner.

Yet another object of this invention is to provide an improved navigational device having a plurality of calculated scales, each of which applies to a given aircraft speed and is adapted to correspond with a map or chart of a given scale so that distances on the map or chart may be measured in terms of time units rather than units of distance.

Yet another object of this invention is to provide an improved system of ascertaining elapsed time and/or determining ground-speed which utilizes navigational charts and scales made in accordance with said charts, for various speeds, whereby a quick and substantially fool-proof determination is made of the desired data.

A construction designed to carry out the invention will be hereinafter described together with other features of the invention.

Figure 2:
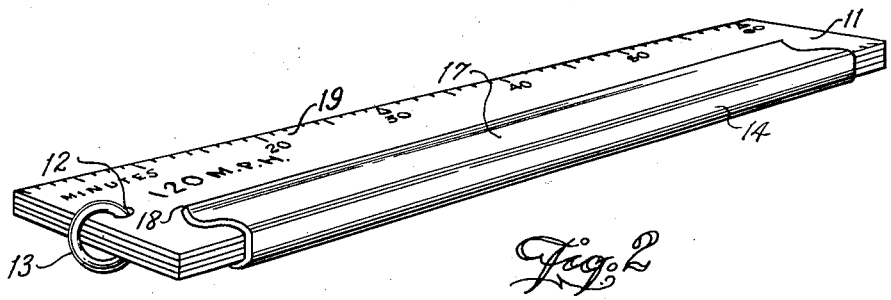
Figure 3:
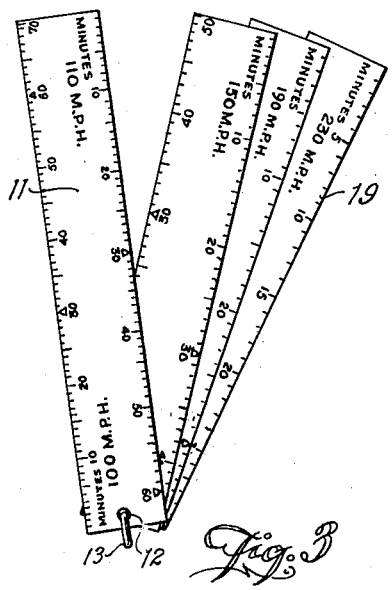
Figure 4:
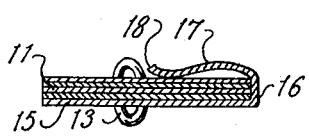

The invention will be more readily understood from a reading of the following specification and by reference to the accompanying drawing, wherein an example of the invention is shown, and wherein:

Fig. 1 is a view in elevation of a section of a typical aircraft chart and showing a navigational device constructed in accordance with this invention, applied thereto, Fig. 2 is an enlarged, perspective view of the navigational device, Fig. 3 is a plan view of the scale strips removed from the retaining clip, and Fig. 4 is a cross-sectional view showing the arrangement of the strips within the clip.

In the drawing, the numeral 10 designates a section of an aircraft chart having various indications thereon showing the location of towns and highways, and the other landmarks customarily shown on such charts. These charts are normally made in one of two standard scales. (The larger scale charts cover ¼ the area the small scale charts cover, for chart of same size. In theory at least, the larger scale chart is preferable for the slower aircraft since it contains more detail, hence more frequent check points, and the small scale (large area) chart is preferable for fast planes. In practice, the pilot more often uses the scale of chart he is used to using, regardless of speed of plane or length of trip.)

The present invention includes a plurality of flat, elongate rectangular strips or rules 11 which may be formed of a suitable plastic material, or fiber board, or any other suitable or desirable substance, and which are of sufficient length as to accommodate a suitable scale equivalent in length to the distance on one of the above-mentioned standard charts, which will be flown by the normal aircraft in the course of twenty, or forty, or sixty minutes, or any other desirable length of time. Obviously, the strips may be made of any desirable or suitable lengths. A plurality of the strips 11 are provided in accordance with the requirements of the particular aircraft, or set of conditions, as will be explained more fully hereinafter. Each of these strips 11 is provided with a transverse, circular opening 12 near one end thereof, and a suitable circular ring 13, which may be formed of metal or other desirable material, extends through each of the openings 12 so as to secure the strips in a common unit or bundle. As shown in the Figs. 2 and 4 of the drawing, the strips are adapted to be held in a compact stack by means of a suitable clip 14.

The clip 14 may be formed of aluminum, or stainless steel, or any other suitable or desirable material and is substantially U-shaped in cross section, having one leg longer than the other. The lower plate 15, which represents the longer leg of the above described cross section, is adapted to underlie and support the stack of strips or rules. The clip is bent upwardly at the rearward edge of the lower plate 15 to form an upstanding side plate 16 against which the edges of the strips abut, and the upper portion of the clip is bent forwardly so as to form an upper plate 17 which overlies the uppermost strip 11. The outer edge of the upper plate 17 may be turned upwardly to form curved lip 18 which facilitates the insertion of the strips into the clip. As will be obvious, any suitable or desirable type of clipping element may be utilized so long as it holds the scales in a compact stack and makes available the particular scale being utilized. The present clip is particularly advantageous because, as shown in Figures 1 and 2, it conceals all the scales except that being used.

Each of the strips 11 is provided with four scales 19, one along each edge of each side of the strip. Each scale is calculated for a different ground-speed, the range of speed shown upon the strips being governed by the nature of the aircraft or the operating conditions under which the aircraft is to be used. In the forms shown in the drawing four strips are utilized, each of which carries scales for four speeds, so that speeds from 100 miles per hour to 250 miles per hour are provided. The number of strips utilized and the interval of speed between each scale shown on the strips will depend usually upon the aircraft for which the device is to be used. Thus, for slow aircraft, scales may be provided in intervals of 5 miles per hour, while for extremely fast aircraft, scales may be provided in intervals of 10 or 20 miles per hour. In addition, only two or three strips may be utilized to cover a relatively narrow speed range, or a larger number of strips may be employed to cover a very wide speed range and provide a navigational device adaptable for use with substantially any standard aircraft.

Each scale is divided into units representing minutes of time. The size of these divisions will vary from scale to scale depending upon the ground-speed for which that particular scale was calculated. In this manner, as shown in Fig. 3 of the drawings, the scale for 100 miles per hour ground-speed covers seventy minutes of time. This scale is of such length and the minute divisions of such width, that each divsion represents the distance on a standard chart which will be covered in one minute by an aircraft flying at 100 miles per hour. The entire scale of seventy minutes represents the distance on a standard chart which will be covered by an aircraft flying 100 miles an hour for seventy minutes. For scales based on higher ground-speeds, the minute divisions must be larger since an aircraft obviously will cover a greater distance in one minute at 110 or 120 miles per hour than it will at 100 miles per hour. Thus, the scale shown in Fig. 3 for a ground-speed of 110 miles per hour has a total length of about sixty-three minutes as compared to a length of seventy minutes for the 100 mile per hour scale. The minute divisions increase correspondingly in width in accordance with increasing ground-speed so that for the 230 mile per hour scale only about thirty minutes of flight can be shown on the same length of scale on which seventy minutes was shown at 100 miles per hour. Obviously, the scales may be made of any desired length so that a flight time of any desired length of time may be shown on one strip at any given ground-speed. The length of the scales as shown in Fig. 3 are entirely arbitrary and are not to be construed as limiting the invention.

In the use of this improved navigational device, a scale is selected which most closely approaches the estimated true ground-speed of the aircraft being flown. The strips 11 may be manipulated about the ring 13 so as to place the selected scale uppermost in the stack of strips. The stack may then be turned to the left or right and inserted in the clip 14 so that only the selected scale appears. It is pointed out, that the upper plate 17 will cover that scale which appears on the opposite edge of the selected strip, and the bottom plate 15 will cover both scales of the lowermost strip. For this reason, the device may be picked up while in any position and readily and quickly turned so that proper scale appears. This is true since only one scale is exposed and the pilot or navigator need not inspect the scale closely to make certain he is using the right scale.

Referring to the sample chart shown in Fig. 1, assume an aircraft leaves Centre at a certain time with an estimated ground-speed of 120 miles per hour on an intended course passing just south of Brownwood and over Woodville. By selecting the 120 miles per hour scale and properly positioning this scale in the clip 14, as shown in Fig. 2, the pilot or navigator may superimpose the scale upon the chart and see at a glance that he should arrive over Brownwood in twenty-three minutes and over Woodville in about forty-two or forty-three minutes. Similarly, the pilot may estimate accurately the time at which he should cross rivers or railroads, or other landmarks which appear on the chart and may be identified from the air. Thus, the pilot or navigator may estimate in advance his position at any time and will know in advance when to start looking for a particular check point or landmark so as to check and verify his position. This operation is carried out with the present device with a minimum of difficulty and loss of time, and greatly minimizes the possibility of making a mistake in calculations or the application of the calculated results to the particular problem at hand.

At the same time the above-described function of this invention is being utilized, the pilot may keep a constant check on his true ground-speed. The ground-speed actually made good often varies considerably from a pilot's initial estimate, and may change further during a flight, due mainly to the variable nature of winds. Referring again to Fig. 1, the pilot assumes a ground-speed of 120 miles per hour, based on the intended air speed of his craft along with the estimated wind direction and velocity. The pilot should arrive just south of Brownwood in twenty-three minutes if this ground-speed is made good. Assume, however, that he arrives by Brownwood in twenty minutes, and is able to identify Brownwood as such, knowing he should be in its vicinity. He will know from this that his ground-speed is greater than his estimated 120 miles per hour. He may then with reasonable accuracy determine his true ground-speed by comparing various ones of the other scales with the chart until he finds a scale which shows a flying time of approximately twenty minutes between Centre and Brownwood. Obviously, his speed is greater, but not extremely greater, so that the scales for 130, 140, or 150 miles per hour ground-speed would probably be the only scales which need be tried. Having thus determined a new more accurate ground-speed by matching the flying time on a scale to the actual elapsed time between recognized check points, the pilot may then use this new ground-speed scale to estimate time-of-arrival at points still ahead.

In the course of a flight of considerable distance from one part of the country to another, a pilot is continuously checking his position with respect to certain landmarks. Utilizing the present invention, the pilot may estimate in advance his time of arrival over certain points, and at the same time maintain a continuous check upon his true ground-speed. One of the greatest problems confronting a pilot in aerial navigation is thus overcome by allowing the pilot to keep a close check at all times on his true ground-speed and his position. As he encounters varying winds which affect his ground-speed, this change in speed is easily and quickly brought to his attention and means are provided for taking such changing winds into account with a minimum of difficulty and loss of time.

Assuming on the other hand, that the pilot leaves Centre at a certain time, assuming a true ground-speed of 120 miles per hour, and arrives over Brownwood in thirty minutes. This information will notify the pilot that he is flying at a slower ground-speed than 120 miles an hour and he may select the suitable scale which represents his true ground speed in accordance with the procedure outlined hereinbefore. Thus, after a pilot is in flight and has arrived over a check point or two, he can choose a "faster" or "slower" scale depending upon whether he is arriving over the check points earlier or later than his estimated time. By so doing, he is then determining his true ground-speed within close limits simply by matching the time marked on the various scales to the time actually required to fly between two points. As changing winds or other factors change the aircraft's true ground-speed, this fact will show up readily as described hereinabove. By simply using the scale that matches his time between check points, the pilot is kept aware of the current true ground-speed at all times. To determine his approximate position when no check points are available, the pilot has but to measure ahead on his course line the elapsed time from the last identified check point. He thereby may establish his estimated position at any particular moment of time within relatively close limits.

In addition to eliminating calculations in time-speed-distance problems, the device is very convenient and useful for planning changes of course in flight, such as are necessitated by storms, or changing course to go to the nearest air port or the like.

This device eliminates a considerable amount of the complicated paraphernalia usually necessary for accurate navigation in the course of flying "contact." It thereby enables the pilot to devote the necessary time to the handling of his aircraft and eliminates a great number of the errors caused by a pilot having too many things to do at one time. Quite often, a pilot is unable to devote his entire attention to the navigation problem at hand so that the possibility of errors is increased. When the problem has been solved, sometimes the check point has already been passed and a new problem is presented without the benefit of verification of the computations based on the time of arrival over the check point which was missed. In this manner, a pilot often becomes lost due to the increasing error between check points caused by his inability to solve the navigational problems correctly in the short time usually available.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A navigational device including, a plurality of elongate strips superposed in a stack and joined together at one end into a bundle, an elongate clip disposed along one longitudinal edge of said stack having legs engaging the upper and lower sides thereof, the upper leg of the clip being less in width than the width of the strips so as to expose one margin of the uppermost strip, the lower leg of the clip being of substantially the same width as the strips so as to conceal the lowermost strip, a plurality of scales upon each strip at least one upon each face of each strip, each scale corresponding to a certain speed, and spaced scale marks indicating units of time displayed by each scale, the spacing between adjacent marks which indicate one unit of time on any one scale being equal to the distance as measured on a navigational chart of a known scale of reduction which would be traveled in one unit of time at the speed to which that particular scale corresponds.

2. A navigational device including, a plurality of elongate strips superposed in a stack and joined together at one end by a ring into a bundle, an elongate clip disposed along one longitudinal edge of said stack having legs engaging the upper and lower sides thereof, a plurality of scales upon each strip one along each longitudinal edge of each face thereof, the width of the upper leg of the clip being such as to conceal all of the upper strip in the stack except the scale along one edge thereof, the lower leg of the clip being of substantially the same width as the strips so as to conceal the scales upon the lowermost strip, each of said scales corresponding to a certain speed, and spaced scale marks indicating units of time displayed by each scale, the spacing between adjacent marks which indicate one unit of time on any one scale being equal to the distance as measured on a navigational chart of a known scale of reduction which would be traveled in one unit of time at the speed to which that particular scale corresponds.

3. A navigational device including, a plurality of elongate strips superposed in a stack, holding means joining the strips loosely together, each of said strips having a pair of scales upon each side, and an elongate clip embracing one longitudinal edge of the stack of strips and having legs engaging the upper and lower sides of the stack, the upper leg being less in width than the width of the strips so as to expose the scale along one edge of the uppermost strip, and the lower leg being of substantially the same width as the strips so as to conceal the scales upon the lowermost strip.

4. A navigational device including, a plurality of elongate strips superposed in a stack, each of the strips having a pair of scales on each side, and an elongate strip embracing one longitudinal edge of the stack of strips and having legs engaging the upper and lower sides of the stack, the upper leg being less in width than the width of the strips so as to expose the scale along one edge of the uppermost strip, and the lower leg being of substantially the same width as the strips so as to conceal the scales upon the lowermost strip.

PAUL R. SHIPPS.

REFERENCES CITED

The following references are of record in the file of this patent:

UNITED STATES PATENTS

| Number | Name | Date |
| --- | --- | --- |
| 123,360 | Porter et al. | Feb. 6, 1872 |
| 305,665 | Castles | Sept. 23, 1884 |
| 332,958 | Smith | Dec. 22, 1885 |
| 371,741 | Darling | Oct. 18, 1887 |
| 644,756 | Bailey | Mar. 6, 1900 |
| 987,703 | Curtin | Mar. 28, 1911 |
| 1,249,615 | Gillette | Dec. 11, 1917 |
| 1,478,219 | Hammitt | Dec. 18, 1923 |
| 2,304,327 | Anderson | Dec. 8, 1942 |
| 2,339,516 | Quillen | Jan. 18, 1944 |
| 2,370,305 | Guditz | Feb. 27, 1945 |
| 2,396,929 | Putman | Mar. 19, 1946 |
| 2,495,777 | Schroeder | Jan. 31, 1950 |

FOREIGN PATENTS

| Number | Country | Date |
| --- | --- | --- |
| 123,730 | Great Britain | Nov. 13, 1919 |
| 840,947 | France | Jan. 28, 1939 |